United States Patent [19]
Kimura et al.

[11] Patent Number: 5,323,137
[45] Date of Patent: Jun. 21, 1994

[54] POTENTIOMETER

[75] Inventors: Masahiro Kimura, Kariya; Yukihisa Oda, Chiryu, both of Japan

[73] Assignee: Aisin Seiki Kabushiki Kaisha, Kariya, Japan

[21] Appl. No.: 853,319

[22] Filed: Mar. 18, 1992

[30] Foreign Application Priority Data

Mar. 18, 1991 [JP] Japan .............................. 3-023821[U]

[51] Int. Cl.$^5$ .............................................. H01C 10/00
[52] U.S. Cl. .................................. 338/196; 338/123; 338/125; 338/160; 338/325
[58] Field of Search ............... 338/196, 123, 125, 195, 338/325, 160-183

[56] References Cited

U.S. PATENT DOCUMENTS 2,291,246  7/1942  Marsten ........................... 338/162
4,150,366  4/1979  Price .

Primary Examiner—Marvin M. Lateef
Attorney, Agent, or Firm—Sughrue, Mion, Zinn, Macpeak & Seas

[57] ABSTRACT

The potentiometer includes a ground terminal 1, a power terminal 2, a resistive element 4 provided between the ground terminal 1 and the power terminal 2, a sliding portion 18 for sliding on the resistive element 4, an output terminal 3 for obtaining the output in response to the position of the sliding portion 18, a reference voltage terminal 5 provided on a reference position RP where a reference voltage Vref should be generated, and a power supply 6 for applying the reference voltage Vref to the reference voltage terminal 5. The reference voltage terminal 5 is provided on the reference position RP where the reference voltage Vref should be generated. The reference voltage Vref is sustained at the reference position RP, because the power supply 6 applies the reference voltage Vref from the reference voltage terminal 5 to the resistive element 4. The offset can be adjusted rapidly due to the regulated voltage at the reference position RP in spite of a productive variation of the resistive element 4. The control system can be stabilized due to the regulated voltage at the reference position RP.

4 Claims, 5 Drawing Sheets

POTENTIOMETER

BACKGROUND OF THE INVENTION

1. Field of the Invention

This invention relates to a potentiometer for use in a rotary positioning sensor and other type of positioning sensors.

2. Description of the Related Art

A conventional potentiometer for detecting a rotary or linear position is shown in FIG. 9.

This potentiometer includes a resistive element 40 formed between a ground terminal 41 and a power terminal 42. The resistive element 40 has a print or a conductive plastic substrate. A sliding potion 44 is slidably mounted on the resistive element 40. A switch pattern (not shown) is formed on the substrate for detecting a specific position. Numeral 43 designates an output terminal of the potentiometer. Detected output is obtained at the output terminal 43 in response to the position of sliding portion 44. Reference output voltage is set by the output which is defined by the position of switch pattern. The output characteristic of this conventional device is shown in FIGS. 10 and 11 wherein the relationship between the position of a sliding portion 44 and the output voltage is shown.

FIG. 10 shows output characteristic before the adjustment of offset and FIG. 11 shows output characteristic after the adjustment of offset is made.

In FIG. 10, two dotted lines show the theoretic output OT and the output before the adjustment is shown at the curved line OF which is substantially smaller than the theoretic output in the entire range. In the drawing, position R1 shows the reference theoretic position and ratio R2 shows the output at the reference position R1. The position R3 is offset from the reference theoretic position R1 with the amount of δ1. In this device, the housing is moved with the amount of δ1 in order to compensate the offset.

FIG. 11 is one example of output characteristic showing a relation between a position of the sliding portion 44 and an output voltage ratio (%) after adjustment is made.

In FIG. 11, the position R4 is a reference position of the sliding portion 44 after the offset adjustment is made. Ratio R5 is an output at the reference position R4. Line OB shows an output characteristic after the offset adjustment is made.

In the above-described potentiometer, the position is detected based on the reference voltage. However, the resistive element 40 is worn away because the sliding portion 44 continuously slides on the resistive element 40.

As the resistive element 40 is worn away, the potentiometer fluctuates the output. The position where the reference output is generated on the sliding portion 44 is changed due to the worn resistive element 40.

In the above-described potentiometer, a reliable and simultaneous control cannot be obtained when a detected output is supplied to a control system, because the output which is detected by the potentiometer is fluctuated.

In the conventional potentiometer, a position of the housing has to be adjusted with respect to an object to be detected in order to compensate the offset.

In the above-described potentiometer, a detected output tends to be different from a theoretic output because a length between a ground terminal 41 and a power terminal 42 is relatively long.

SUMMARY OF THE INVENTION

It is, therefore, an object of the present invention to solve the above conventional drawbacks.

It is another object of the present invention to provide a potentiometer which has a simple offset adjustment function.

It is further object of the present invention to sustain the reference point in spite of the worn resistive element.

It is still another object of the present invention to stabilize the control system.

According to the present invention, the potentiometer comprises a ground terminal, a power terminal, a resistive element provided between the ground terminal and the power terminal, a sliding portion for sliding on the resistive element, an output terminal for obtaining the output in response to the position of the sliding portion, a reference voltage terminal provided on a reference position where a reference voltage should be generated, and a power supply for applying the reference voltage to the reference output terminal.

According to the present invention, the reference voltage terminal is provided on the reference position where the reference voltage should be generated. The reference voltage is sustained at the reference position, because the power supply applies the reference voltage from the reference voltage terminal to the resistive element. The offset can be adjusted rapidly due to the regulated voltage at the reference position in spite of a productive variation of the resistive element. The control system can be stabilized due to the regulated voltage at the reference position.

BRIEF DESCRIPTION OF THE DRAWING

Additional objects and advantages of the present invention will become more apparent from the following detailed description of preferred embodiments thereof when considered with reference to the attached drawings, in which.

DETAILED DESCRIPTION OF THE PREFERRED EMBODIMENTS

Figure 1:
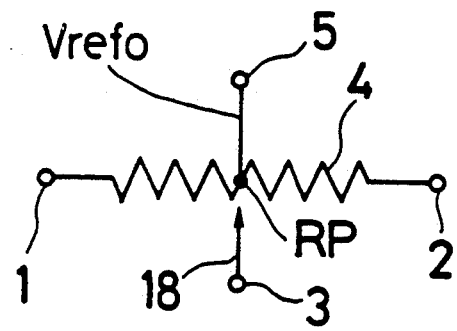
FIG. 1 is an equivalent circuit diagram of a potentiometer according to present invention.

Referring to FIG. 1, a resistive element 4 is formed between a ground terminal 1 and a power terminal 2. The resistive element 4 is formed by a print or a conductive plastic substrate.

A sliding portion 18 is slidably mounted on the resistive element 4. A reference voltage element 5 is connected to a reference point RP where a reference output voltage Vref0 should be generated on the resistive element 4. An output element 3 outputs a voltage in response to a position of the sliding portion 18.

In the above-described potentiometer, an output which is generated at the reference point RP can be equaled to the reference output voltage Vref0 because the reference output voltage Vref0 is applied to the reference output element 5.

Figure 2:
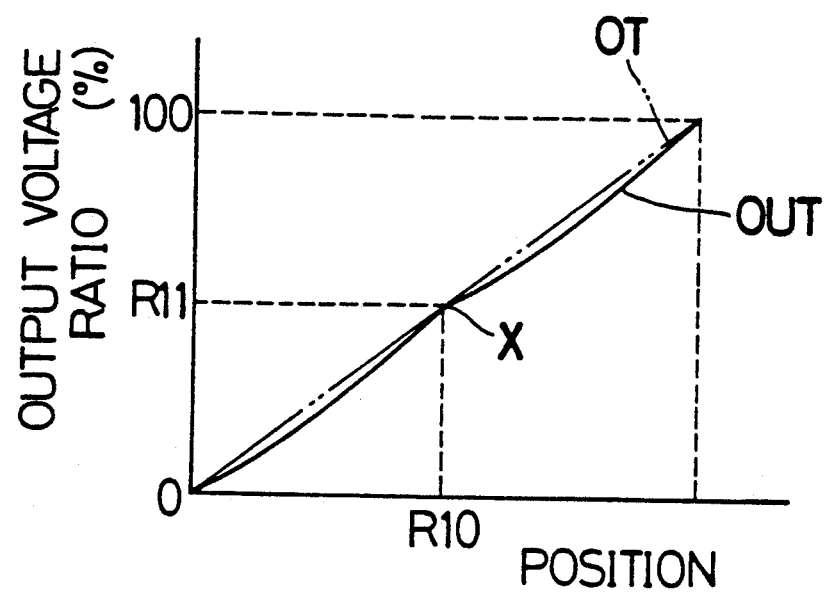
FIG. 2 is a graph showing an output characteristic of a potentiometer according to present invention.

The output characteristic of this invention is shown in FIG. 2. The point R10 shows a reference theoretic position. The point R11 is output at the reference theoretic position R10. The crossing point X shows the output at the reference theoretic position R10. A middle part of the output characteristics agrees with the theoretic output OT at the point X so that actual output characteristics OUT which is shown by curved line almost agrees with the theoretic output OT which is shown by two dotted straight line. Thus, the output of the reference point RP can be always equal to the reference voltage Vref because the reference output voltage Vref0 is applied to the reference output element 5. Therefore, actual output position where the reference voltage is generated can agree with the reference theoretic position RP.

Figure 3:
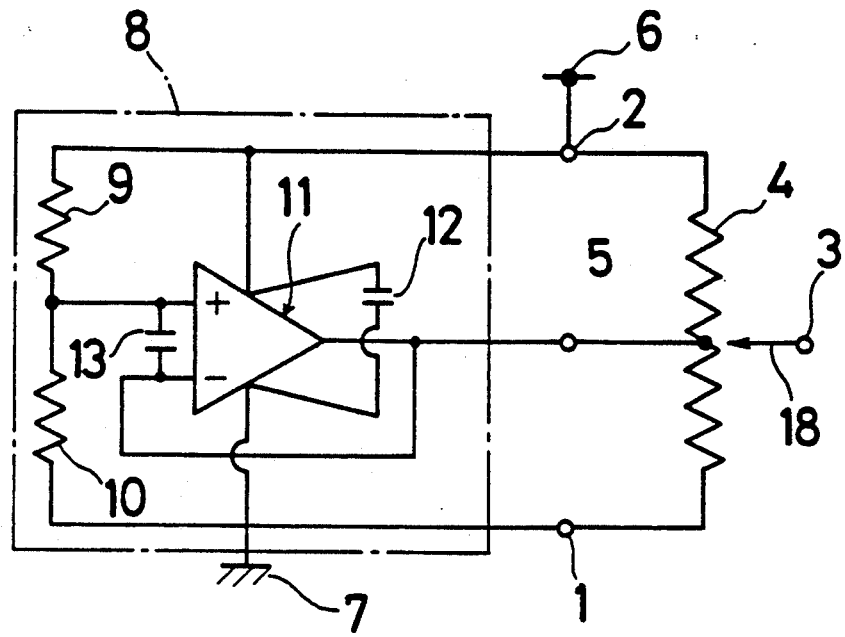
FIG. 3 is an equivalent circuit diagram of a first embodiment according to present invention.

FIG. 3 shows an equivalent circuit of the potentiometer including a voltage follower circuit 8. As shown in FIG. 3, a power supply 6 is connected to a power terminal 2 for supplying electric power to both resistive element 4 and voltage follower circuit 8. An output of the operational amplifier 11 is connected to the reference voltage element 5 in order to apply the reference voltage to the resistive element 4. Numeral 7 shows a ground, and numerals 12 and 13 show condensers for noise-filtering.

In the second embodiment, the output of the operational amplifier 11, i.e. the reference output voltage which is supplied to the resistive element 4 can be variably set by adjusting resistors 9 and 10.

Figure 4:
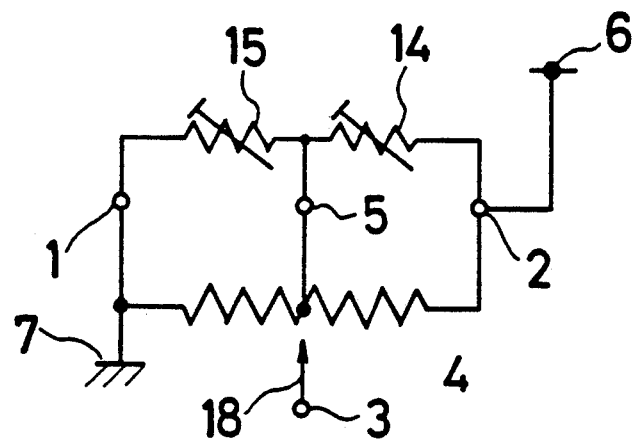
FIG. 4 is an equivalent circuit diagram of a second embodiment according to present invention.

FIG. 4 shows the third embodiment of this invention. As shown in FIG. 4, two trimmable resistors 14 and 15 are connected in parallel to the resistive element 4 between the ground terminal 1 and the power terminal 2. The resistor 14 is connected in series to the resistor 15. The reference voltage terminal 5 is connected between the resistor 14 and the resistor 15. Thus, the reference output voltage which is applied to the reference voltage terminal 5 can be adjusted by trimming two resistors 14 and 15.

Figure 5:
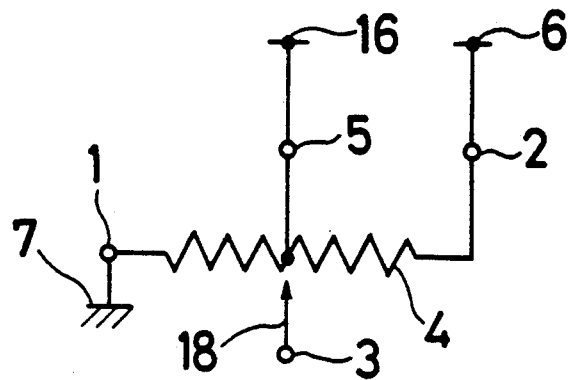
FIG. 5 is an equivalent circuit diagram of a third embodiment according to present invention.

FIG. 5 shows the fourth embodiment of this invention. As shown in FIG. 5, the reference voltage terminal 5 is connected to another power supply 16 for generating reference voltage. Thus, the reference output voltage Vref0 can be applied to the reference voltage terminal 5.

Figure 6:
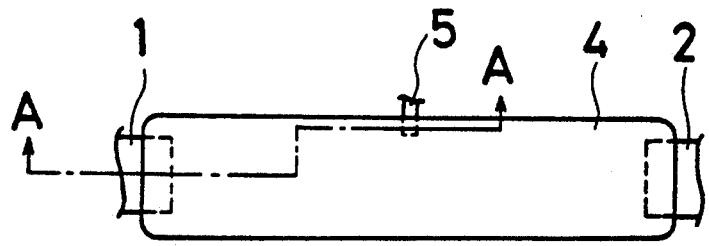
FIG. 6 is a plane view of a potentiometer according to the present invention.
Figure 7:
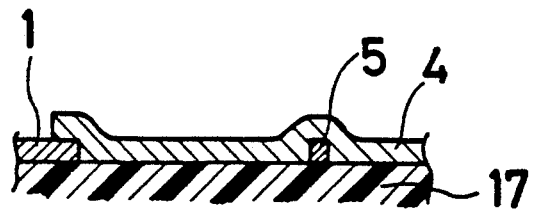
FIG. 7 is a cross-sectional view taken alone line A—A in FIG. 6.
Figure 8:
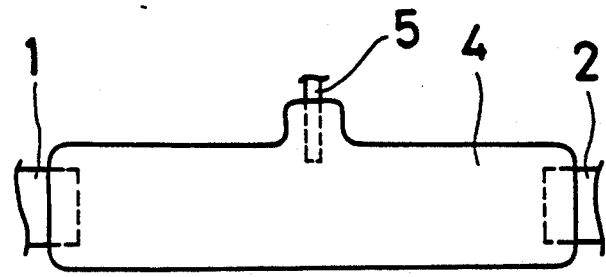
FIG. 8 is a plane view of other potentiometer according to the present invention.
Figure 9:
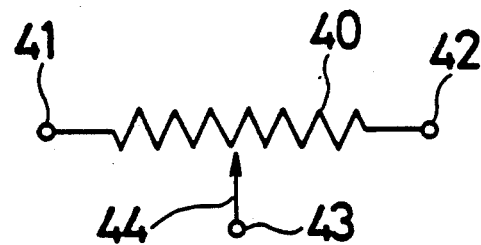
FIG. 9 is an equivalent circuit diagram of a conventional potentiomater.
Figure 10:
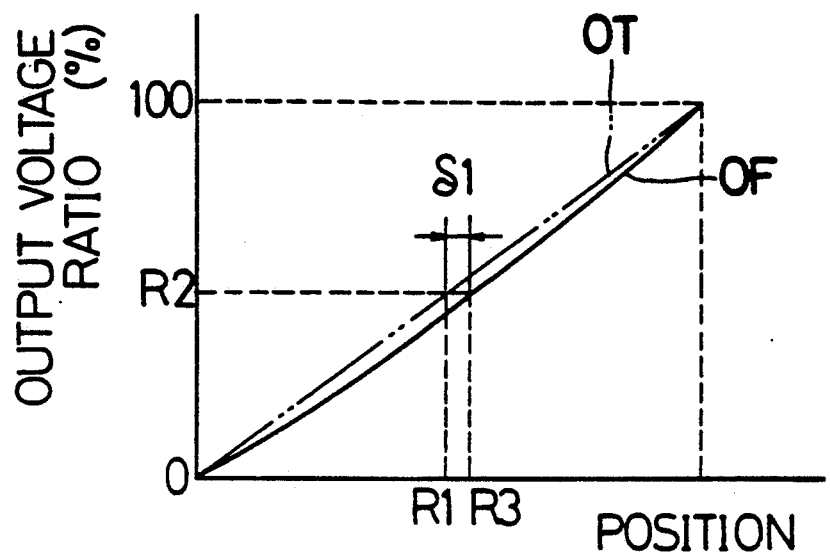
FIG. 10 is a graph showing an output characteristic before adjusting offset of the conventional potentiomater.
Figure 11:
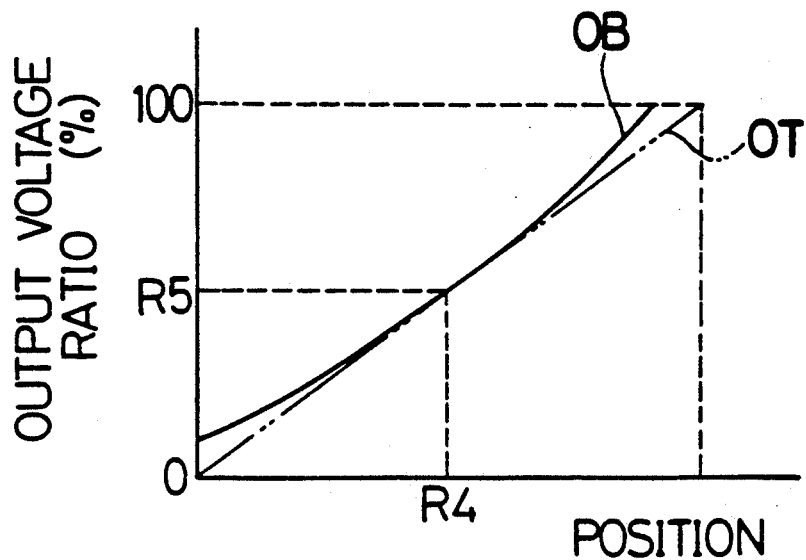
FIG. 11 is a graph showing an output characteristic after adjusting offset of the conventional potentiometer.

FIG. 6 shows a plane view of a potentiometer. FIG. 7 shows a cross-sectional view of a potentiometer. FIG. 8 shows a plane view taken along line A—A in FIG. 6.

As shown in FIGS. 6 and 7, an edge of the reference voltage terminal 5 is located externally from an area which is surrounded by the ground terminal 1 and the power terminal 2.

The potentiometer of this invention can be adapted to either a linear type or a rotary type.

Thus, when the potentiometer is installed in an object to be detected, the offset can be adjusted simply because the position of the reference voltage output can be stabilized.

Because the reference point can be stabilized in spite of the worn resistive element, the potentiometer can become durable. When the detected output is supplied to the control system, a reliable and simultaneous control can be obtained.

What is claimed is:

1. A potentiometer comprising:
    a ground terminal;
    a power terminal;
    a resistive element electrically connected between the ground terminal and the power terminal;
    a first power supply connected to the power terminal;
    a sliding portion for sliding on the resistive element;
    an output terminal connected to said sliding portion for obtaining an output, the output depending on the position of the sliding portion;
    a reference voltage terminal connected to said resistive element, a reference voltage of the resistive element being outputted at said reference voltage terminal; and
    a second power supply, coupled to said reference voltage terminal, for applying the reference voltage to the reference voltage terminal.

2. The potentiometer as defined in claim 1 wherein the second power supply comprises a voltage follower circuit.

3. The potentiometer as defined in claim 1 wherein two trimmable resistors are connected in parallel to the resistive element between the ground terminal and the power terminal.

4. The potentiometer as defined in claim 1 wherein the reference voltage terminal is connected to the second power supply for generating the reference voltage.

* * * * *